US010537825B1

United States Patent
Csizmadia (10) Patent No.: US 10,537,825 B1
(45) Date of Patent: Jan. 21, 2020

(54) SPRAY DRYER SYSTEM WITH HIGH-PRESSURE PRE-HEATING SYSTEM

(71) Applicant: Advanced Process Solutions, Inc., Jeffersonville, IN (US)

(72) Inventor: Daniel S. Csizmadia, Henryville, IN (US)

(73) Assignee: Advanced Process Solutions, Inc., Jeffersonville, IN (US)

( * ) Notice: Subject to any disclaimer, the term of this patent is extended or adjusted under 35 U.S.C. 154(b) by 31 days.

(21) Appl. No.: 15/668,160

(22) Filed: Aug. 3, 2017

Related U.S. Application Data (60) Provisional application No. 62/371,007, filed on Aug. 4, 2016.

(51) Int. Cl.
  *B01D 1/18* (2006.01)
  *B01J 2/04* (2006.01)
  *F26B 3/12* (2006.01)

(52) U.S. Cl.
  CPC . *B01D 1/18* (2013.01); *B01J 2/04* (2013.01); *F26B 3/12* (2013.01)

(58) Field of Classification Search
  CPC ..... B01D 1/16; B01D 1/18; B01D 1/20; B01J 2/04
  See application file for complete search history.

(56) References Cited

U.S. PATENT DOCUMENTS

| | | | |
|---|---|---|---|
| 2008/0149317 A1* | 6/2008 | Baker | F28D 7/022 165/163 |
| 2014/0357778 A1* | 12/2014 | Freidanck | C08F 6/003 524/503 |
| 2016/0060448 A1* | 3/2016 | Killat | B01D 1/18 264/12 |

* cited by examiner

*Primary Examiner* — Brian A McCaig
(74) *Attorney, Agent, or Firm* — Boyle Fredrickson, S.C.

(57) ABSTRACT

A high-pressure pre-heating system is provided for use in a spray dryer system. The high-pressure pre-heating system may include a heat exchanger(s) configured for high-pressure and high velocity product flow, with the heat exchanger(s) preheating liquid product immediately before spray drying. This arrangement reduces heat exposure time of the liquid product that flows at high velocity through the high-pressure heat exchanger(s), which correspondingly reduces the likelihood of fouling surfaces of the heat exchanger(s) or overheating the liquid product.

1 Claim, 8 Drawing Sheets

SPRAY DRYER SYSTEM WITH HIGH-PRESSURE PRE-HEATING SYSTEM

CROSS-REFERENCE TO RELATED APPLICATION

This application claims priority to U.S. Provisional Patent Application Ser. No. 62/371,007 filed on Aug. 4, 2016, the entirety of which is expressly incorporated by reference herein.

FIELD OF THE INVENTION

This invention relates generally to spray dryer systems. More particularly, the present invention is a high-pressure pre-heating system of a spray dryer system.

BACKGROUND OF THE INVENTION

Known spray dry systems use high-pressure pumps that spray liquid products through dryer atomizing nozzles into dryers that produce powders. Quality of the powder can be compromised by bacteria in the liquid product that is converted to powder during spray drying. In order to try reducing bacteria count for increasing dryer yield and quality of the powder, efforts have been made to preheat the liquid product with heat exchangers upstream of the high-pressure pumps and therefore at low pressures.

In known implementations, arranging heat exchangers in low-pressure zones or upstream of the high-pressure pumps is done because typical heat exchangers are configured to operate at relatively low pressures since these typical heat exchangers can have somewhat delicate structures that make them suitable for rapid and efficient heat transference across their materials. Some implementations use multiple parallel heat exchangers in the low-pressure zone to provide greater surface area for a transfer, which further slows down flow rate to relatively low velocities. Preheating with heat exchangers upstream of the high-pressure pumps allows the liquid product to be exposed to high temperatures for relatively long periods of time because the liquid product flows at relatively slow velocities in the low-pressure zone upstream of the high-pressure pumps, especially with parallel heat exchanger implementations.

However, preheating liquid product for relatively long periods of time can have certain drawbacks, including potential powder quality compromises and requiring frequent cleaning of system equipment. Exposing liquid product to elevated temperatures for too long can reduce the quality of the final powdered product. The slow velocity flow rates of the liquid product through the heat exchangers can lead to fouling of the heat exchangers, which requires cleaning before further use. Furthermore, arranging heat exchangers upstream of the high-pressure pumps typically spaces this location is heating relatively far distances away from the dryers themselves. Typically, the dryer atomizing nozzles are located on the tops to the dryers. The dryer atomizing nozzles highly are highly elevated compared to lower floors at which the high-pressure pumps are installed, with the beat exchangers upstream of the high-pressure pumps spaced even further from the dryer atomizing nozzles. The far distances between and long travel time required for the heated liquid product to reach the dryers can lead to substantial decreases in temperature of the previously heated liquid product before atomization, which can reduce the effectiveness of the preheating.

SUMMARY OF THE INVENTION

The present invention is directed to a high-pressure pre-heating system of a spray drying system. The high-pressure pre-heating system may include a heat exchanger(s) configured for high-pressure and high velocity product flow, with the heat exchanger(s) preheating liquid product immediately before spray drying, such as immediately adjacent upstream of spray nozzles to reduce bacterial levels before spraying.

According to one aspect of the invention, the high-pressure pre-heating system may include a high-pressure heat exchanger(s) after the high-pressure pump(s) and thus after the high-pressure timing point. This allows for placing the high-pressure heat exchanger(s) immediately prior to the dryer atomizing nozzles. Direct placement of the high-pressure heat exchanger(s) upstream adjacent the dryer atomizing nozzles reduces heat exposure time of the liquid product that flows at high velocity through the high-pressure heat exchanger(s), which reduces the likelihood of fouling surfaces of the heat exchanger(s) or overheating the liquid product. Multiple high-pressure heat exchangers can be arranged in series, with the series flow further reducing the likelihood of fouling or plugging channels in the heat exchangers and facilitates CIP (clean-in-place) cleaning.

According to another aspect of the invention, a heat exchanger arrangement includes multiple series-connected high-pressure heat exchangers. Each high-pressure heat exchanger is made from heavy wall tubing and has high-pressure fittings. The high-pressure heat exchanger(s) may be a coil heat exchanger with a coil of tubing that spirals through an interior of the heat exchanger. A heating medium such as steam or hot water flows through the interior of the heat exchanger which defines a heating medium passage. The coil of tubing may define a product passage through which the liquid product flows along a spiraling flow path surrounded by the heating medium, with the wall of the coiled tubing providing a heat transfer surface across which heat from a heating medium is conducted for heating the liquid product.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 1:
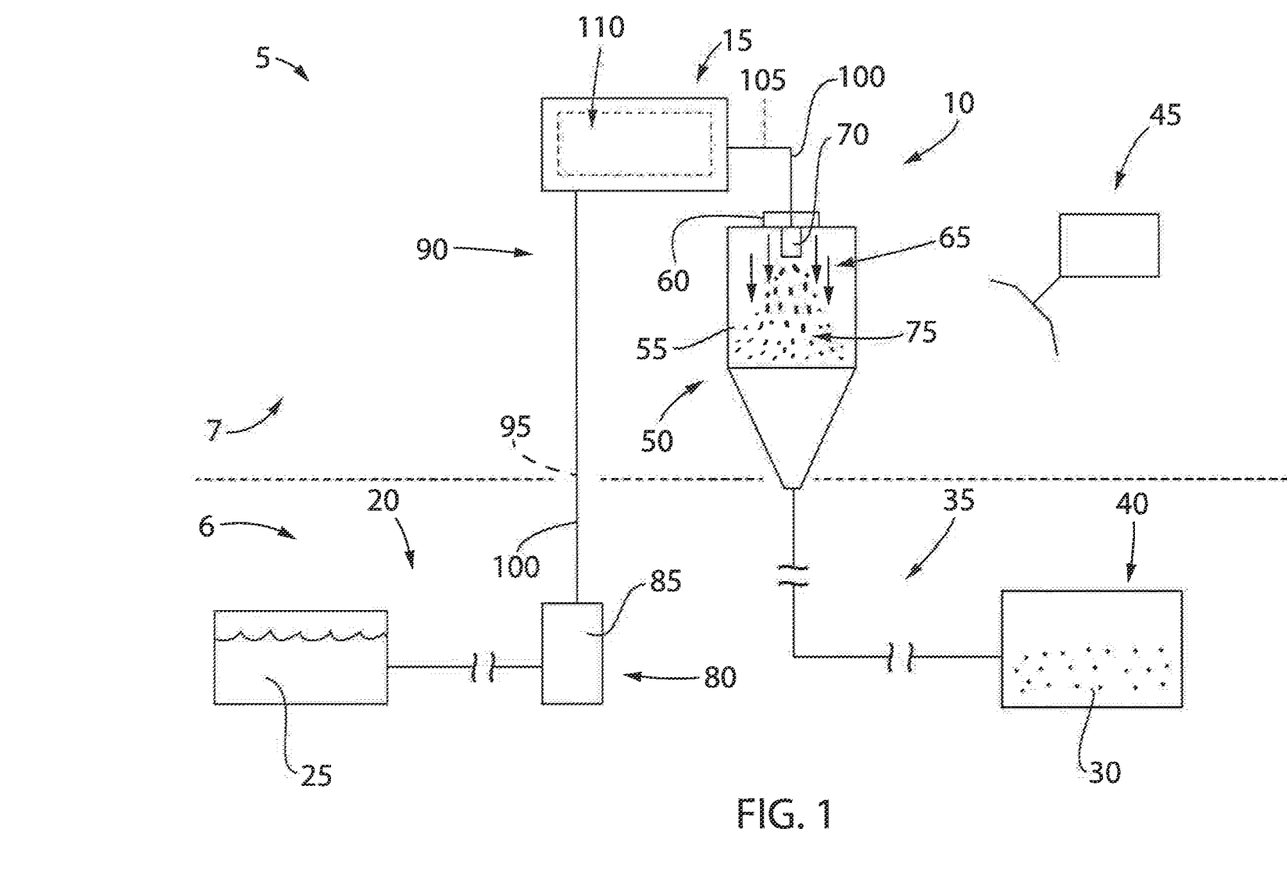
FIG. 1 is a simplified schematic representation of a spray drying facility with a spray dryer system with high-pressure pre-heating system of the present invention.

Referring now to FIG. 1, a spray drying facility 5 is represented implementing a spray dryer system 10 with a high-pressure pre-heating system 15. Spray drying facility 5 is used for making a spray-dried product(s) such as powder from a liquid product, including making a powdered dairy product from a liquid dairy product such as whey powder from liquid whey. Spray drying facility 5 is shown as a multi-story or multi-level facility with a first or lower floor, shown as lower level 6 and a second or upper floor, shown as upper level 7.

Still referring to FIG. 1, liquid product infeed system 20 is configured to deliver liquid product 25 through spray drying facility 5 to spray dryer system 10 that dries the liquid product 25 to produce the powdered or dried product 30, which is delivered by a dry product outfeed system 35 to a downstream location in the facility, such as a storage and/or packaging station 40. Control system 45 includes a user interface that allows a user to input commands or other information to the control system 45 and monitor system characteristics and process statuses. Control system 45 includes a computer, which may be an industrial computer or, e.g., a programmable logic controller (PLC), with circuitry that includes a processor that is configured to execute particular applications that operate in accordance with a computer software program that is stored in memory. The computer receives data and/or signals from various sensors wirelessly or through conductors in the spray drying facility 5 for evaluating and executing control decisions while controlling various electronic, pneumatic, and/or hydraulic components such as electro-mechanical valves, pumps, motors, solenoids, and various actuators for operation of the spray drying facility 5.

Still referring to FIG. 1, spray dryer system 10 includes dryer tower 50 that has a drying chamber 55. Drying air inlet 60 introduces airflow 65 into the dryer tower 50, which may be a volume of heated air flowing at a high velocity and is shown directed vertically down through drying chamber 55. Dryer nozzle 70 is configured to introduce the liquid product 25 into drying chamber 55 by spraying as-sprayed product 75, shown as spraying vertically down from the top of drying chamber 55 toward the bottom drying chamber 55. Dryer nozzle 70 is shown configured to atomize the liquid product 25 into an aerosol spray, represented at sprayed product 75, that flows through drying chamber 55 during a drying process.

Still referring to FIG. 1, pressurizing pressure system 80 includes a high-pressure pump 85 that pressurizes and delivers liquid product 25 toward dryer tower 50. High-pressure zone 90 is defined as the portion(s) of spray dryer system between high-pressure pump 85 and dryer tower 50. Within high-pressure zone 90, liquid product 25 leaves the high-pressure pump 85 as pressurized liquid product 95 that is pressurized and travels at a high velocity.

Still referring to FIG. 1, pressurized liquid product 95 within high-pressure zone 90 flows at high-pressure and velocity through high-pressure-rated tubing 100 into high-pressure pre-heating system 15. High-pressure pre-heating system 15 receives and heats the pressurized liquid product 95 within high-pressure zone 90 and delivers the pressurized liquid product 95 as heated pressurized liquid product 105 for delivery through dryer nozzle 70 for spray release into drying chamber 55. High-pressure pre-heating system 15 includes a heat exchanger arrangement 110 that heats the pressurized liquid product 95 and releases it as heated pressurized liquid product 105.

Figure 2:
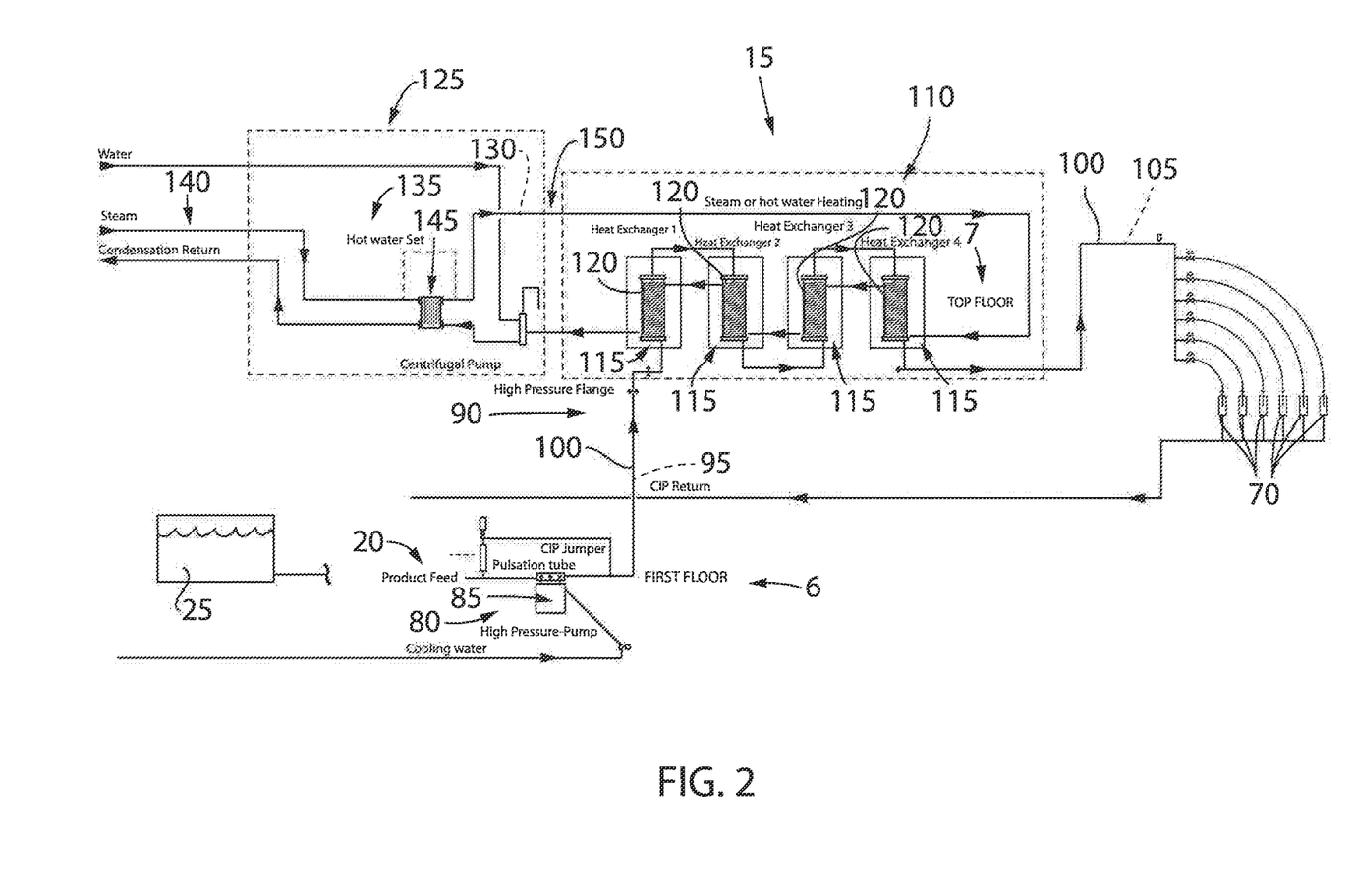
FIG. 2 a simplified schematic representation of the high-pressure pre-heating system of FIG. 1.
Figure 3:
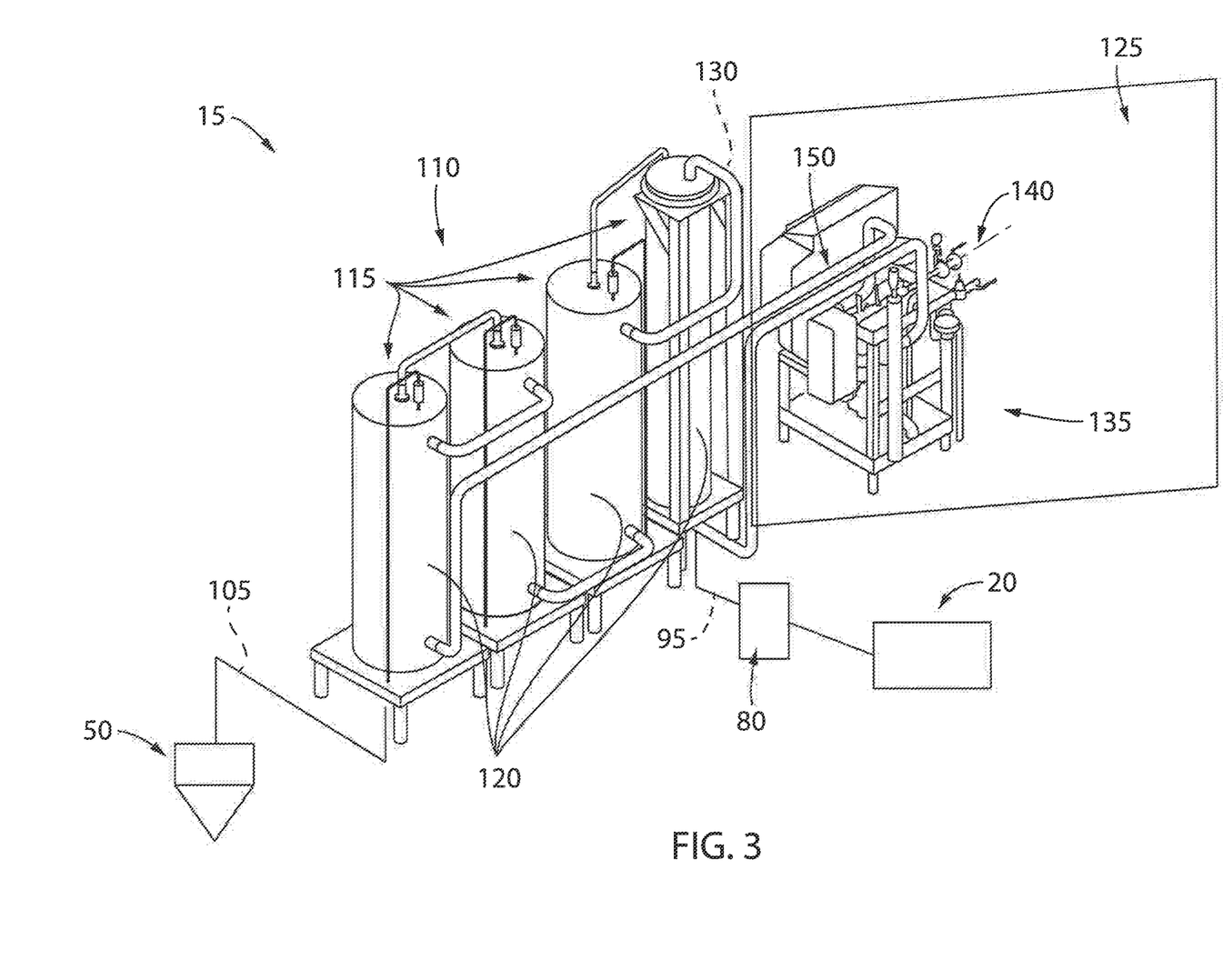
FIG. 3 is a pictorial view of the high-pressure pre-heating system of FIG. 2.
Figure 4:
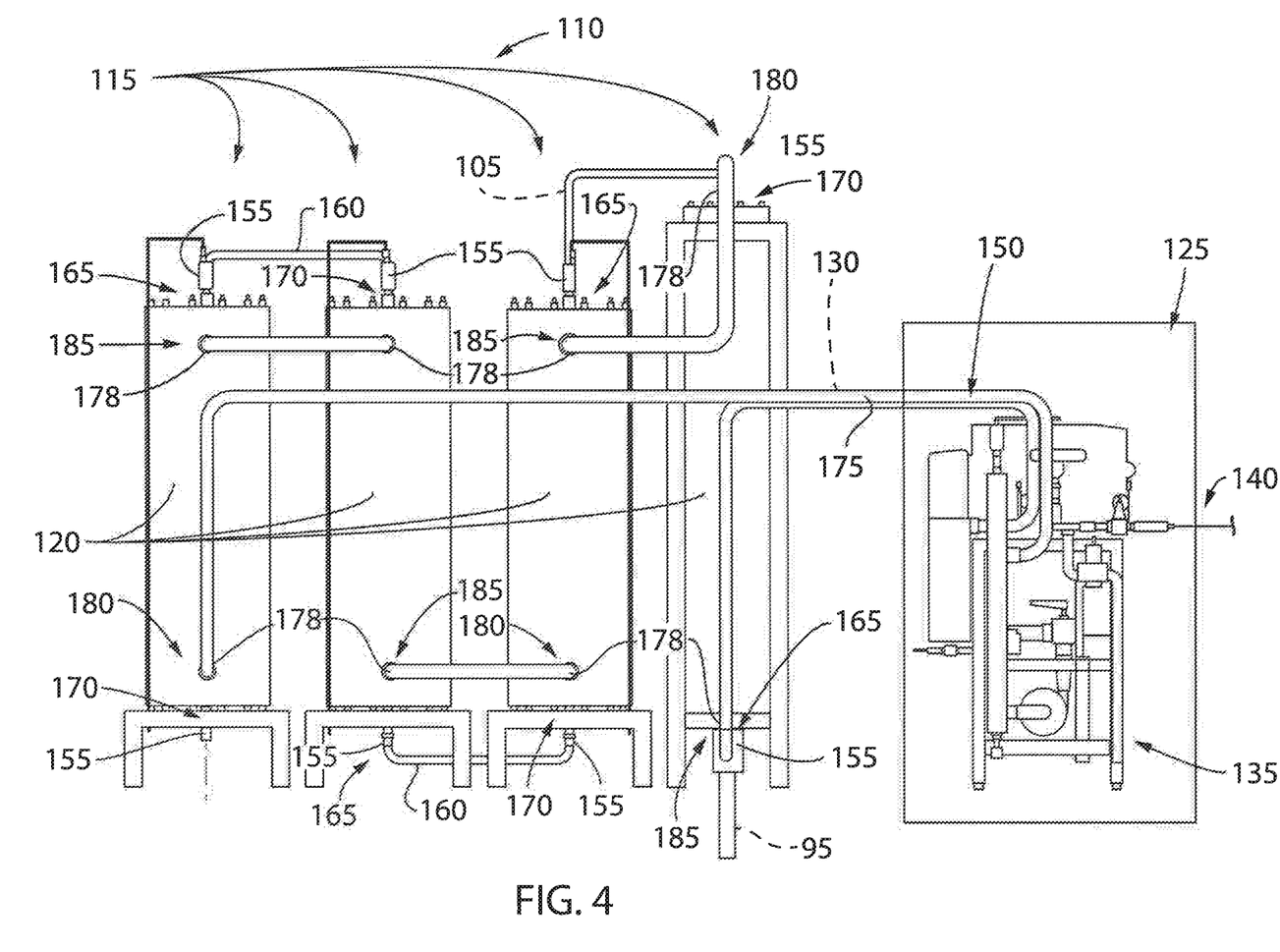
FIG. 4 is a side elevation view of portions of the high-pressure pre-heating system of FIG. 3.
Figure 5:
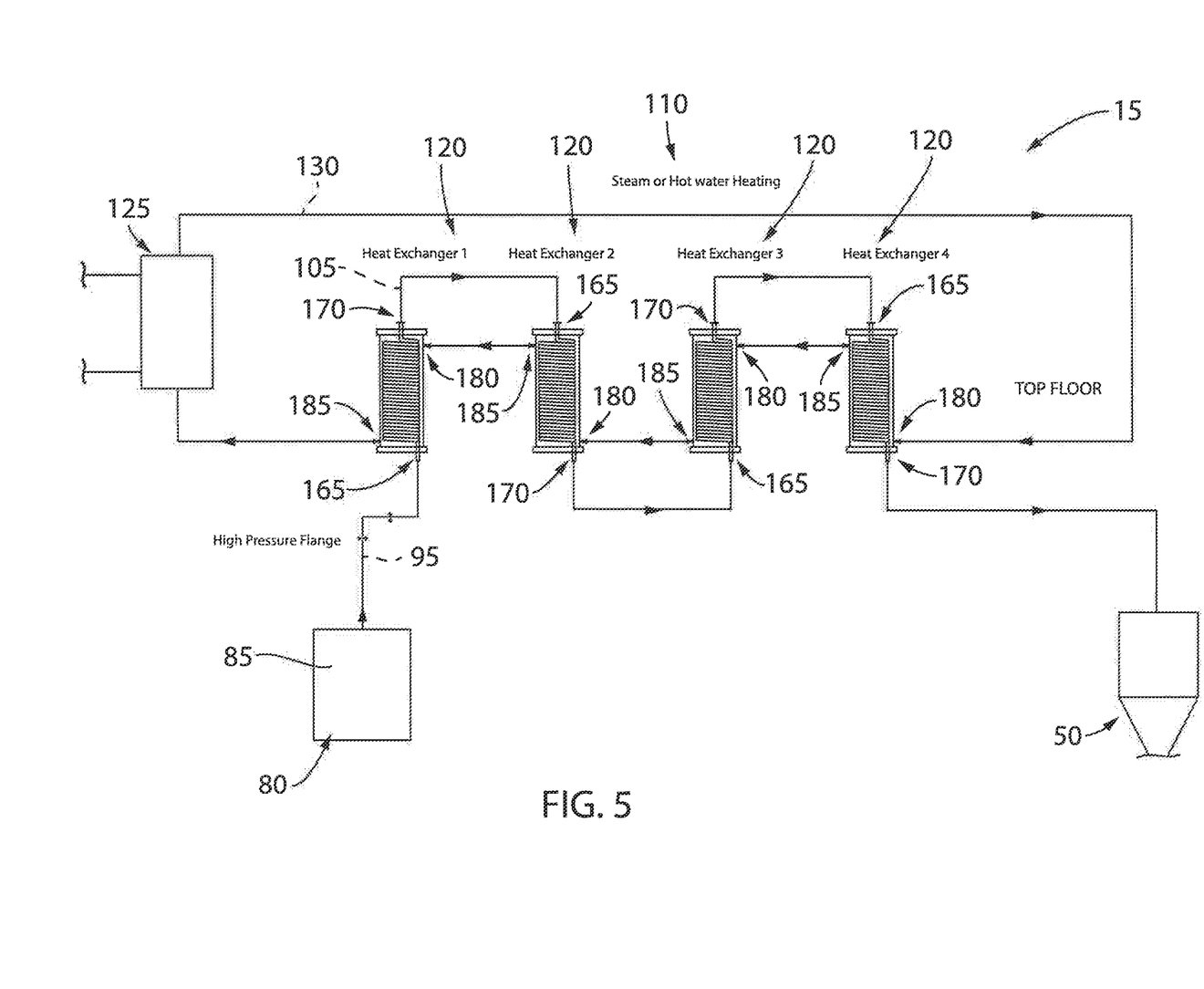
FIG. 5 is a schematic representation of various flow paths through the high-pressure pre-heating system.
Figure 6:
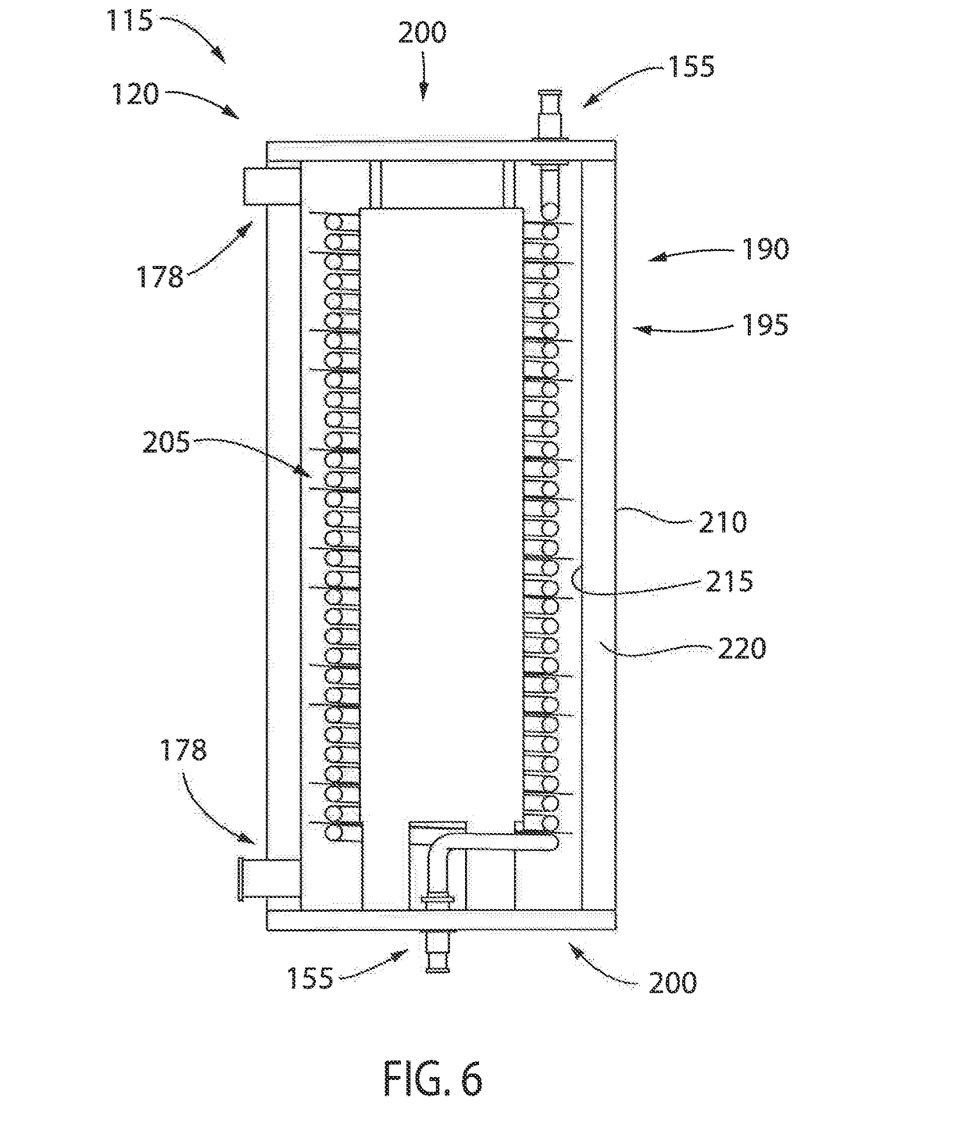
FIG. 6 is a cross-sectional side elevation view of a heat exchanger of the high-pressure pre-heating system.

Referring now to FIGS. 2 and 3, heat exchanger arrangement 110 has multiple heat exchangers 115, shown here as coil heat exchangers 120, connected to each other in series. Heating system 125 includes a heating medium 130 that flows through heat exchangers 115 to heat the pressurized liquid product 95 (FIG. 2), converting it into heated pressurized liquid product 105 while flowing at high-pressure and velocity. Heating system 125 is represented in FIGS. 2 and 3 as a hot water or steam system, whereby the heating medium 130 is correspondingly hot water or steam. Heating system 125 includes hot water set 135 that receives steam or hot water from a boiler or other heater through a primary heating loop 140. Referring now to FIG. 2, hot water set 135 has a hot water set heat exchanger 145 arranged in both the primary heating loop 140 and a secondary heating loop 150 through which heating medium 130 flows after being heated in the hot water set heat exchanger 145 by the steam or hot water in the primary heating loop 140.

Referring now to FIG. 4, coil heat exchangers 120 are connected to each other in series, for series flow of both the heating medium 130 and pressurized liquid product 95 as heated pressurized liquid product 105 through heat exchanger arrangement 110. Each coil heat exchanger 120 is made from high pressure rated materials and components, including heavy wall tubing and has high-pressure fittings such as high-pressure product tubing fittings 155. Product tubing 160 interconnects the high-pressure product tubing fittings 155 at product inlets and outlets 165, 170 of the coil heat exchangers 120 to make the series connections.

Still referring to FIG. 4, similar to the product tubing 160, heating medium tubing 175 interconnects heating medium tubing fittings 178 at heating medium inlets and outlets 180, 185 of coil heat exchangers 120 to each other. This provides a series connection of the coil heat exchangers 120 with each other in a series flow path through the heat exchanger arrangement 110, along which heating medium 130 from hot water set 135 flows.

Referring now to FIG. 5, although both pressurized liquid product 95 and heating medium 130 flow in series through coil heat exchangers 120, pressurized liquid product 95 and heating medium 130 are shown flowing in generally opposite directions through the heat exchanger arrangement 110. Pressurized liquid product 95 flows in a generally left to right flow direction and heating medium 130 flows in a generally right to left flow direction through heat exchanger arrangement 110. This allows the high-pressure pre-heating system 15 to define a passively-staged progressive heating arrangement in which heat exchangers 115 are at progressively greater temperatures in the direction of flow of the pressurized liquid product 95. The first heat exchanger 115 the pressurized liquid product 95 enters may be the coolest in the series and the temperatures of subsequent heat exchangers 115 increase as they get closer to dryer nozzle(s) 70. That is due to heat loss of the heating medium 130 while shedding its heat to increase the temperature of the pressurized liquid product 95 in the opposite direction of flow of the pressurized liquid product 95.

Referring now to FIG. 6, each coil heat exchanger 120 has a body 190 with interconnected side wall(s) 195 and end walls 200 that enclose heat exchanger interior 205. Side wall 195 is shown as a multi-layered circumferential side wall with outer and inner wall layers 210, 215 on opposite sides of insulation 220.

Figure 7:
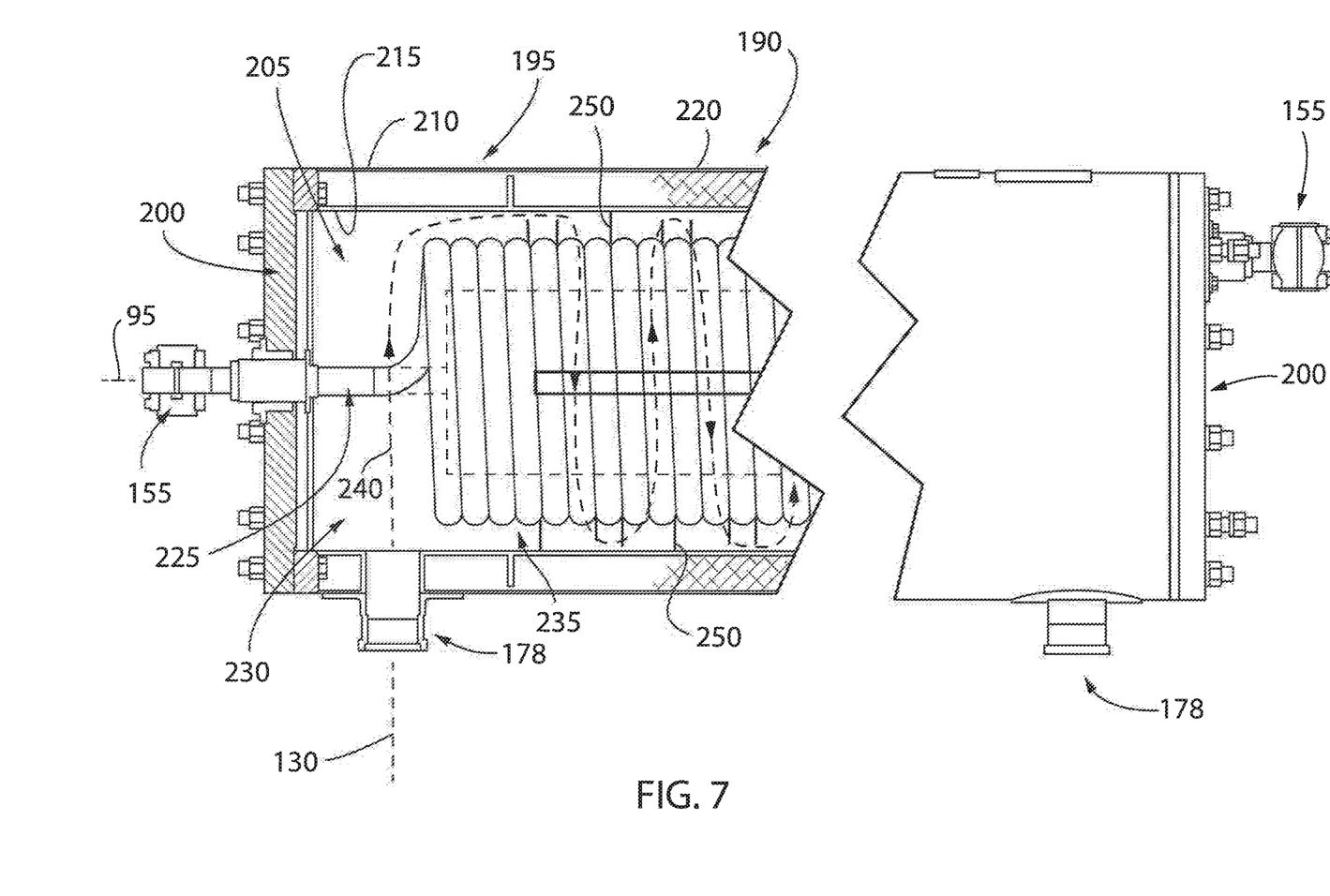
FIG. 7 is a partially cross-sectional side elevation view of a heat exchanger of the high-pressure pre-heating system.

Referring now to FIG. 7, product passage 225 and heating medium passage 230 extend through heat exchanger interior 205, through which pressurized liquid product 95 and heating medium 130 respectively flow. Product passage 225 is shown defined by a coiled tube 235 that extends along a spiral path through the heat exchanger interior 205 providing a spiral flow path for the product passage 225. Heating medium passage 230 provides a flow path that extends both longitudinally through the heat exchanger interior and transversely back and forth through the heat exchanger interior 205, as represented by dashed arrow 240. The flow path of heating medium passage 230 is directed by baffle plates 250 that are arranged within the heat exchanger interior 205.

Figure 8:
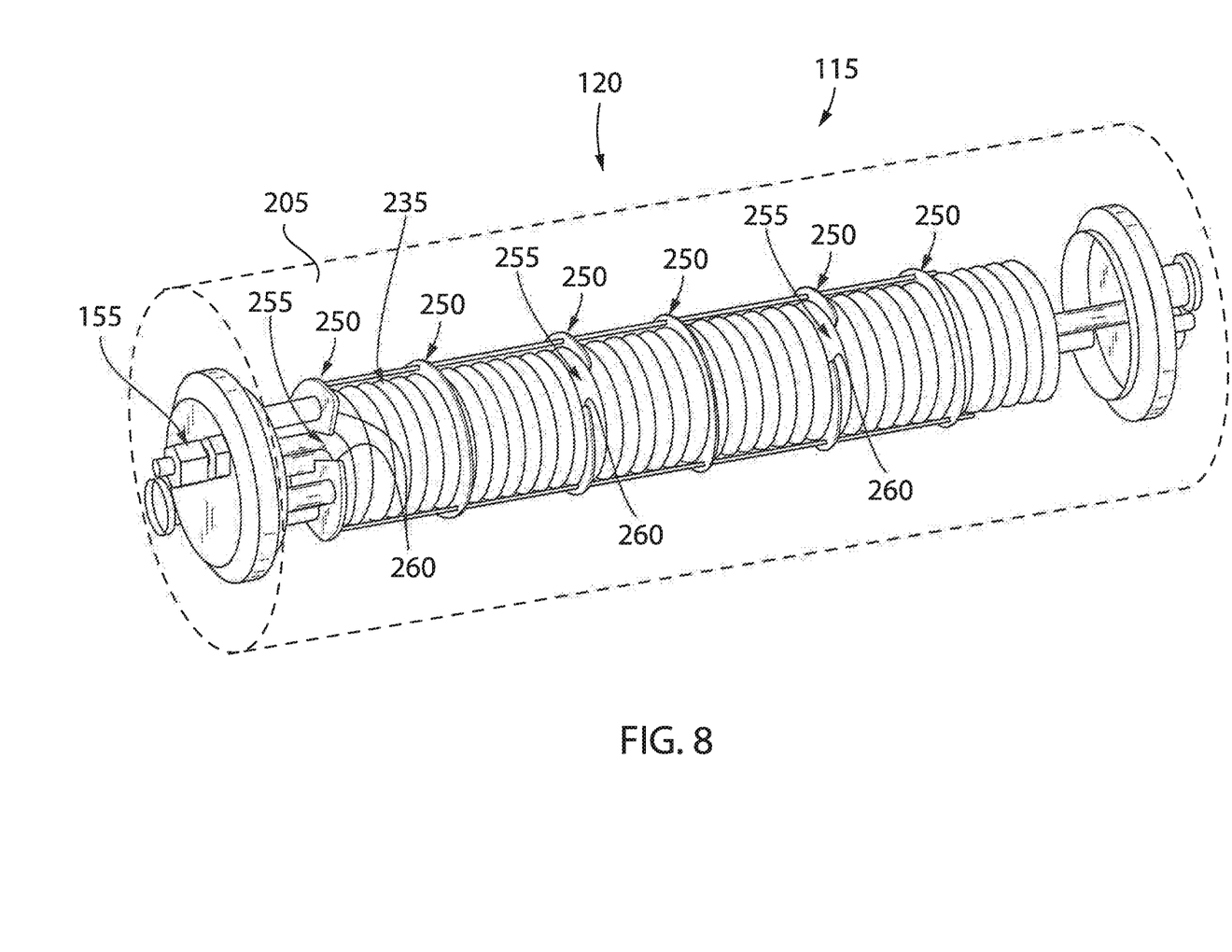
FIG. 8 is pictorial view of portions of a heat exchanger of the high-pressure pre-heating system.

Referring now to FIG. 8, baffle plates 245 are shown with generally circular perimeter shapes and spaced from each other within the heat exchanger interior 205. Each baffle plate 250 has an opening shown as baffle plate opening 255 through which the heating medium 130 (FIG. 2) passes while flowing through the heat exchanger interior 205. The baffle plate openings 255 of adjacent baffle plates 205 face generally opposite directions. This directs the heating medium 130 (FIG. 2) through heating medium passage 230 (FIG. 7) along the transversely back-and-forth flow path 240 (FIG. 7). Each baffle plate opening 255 is shown defined between a pair of radially extending edges 260 that extend away from each other from an intermediate portion of baffle plate 250 to the outer perimeter of baffle plate 250. Baffle plate opening 255 may be formed by making a radial slit from the outer perimeter of baffle 250 toward its center portion and bending segments on opposite sides of the slit in opposite directions to provide a V-shaped gap when viewed in side elevation.

Referring now to FIGS. 1-2, during use, control system 45 controls the various components of high-pressure pre-heating system 15 to ensure that the liquid product is heated to an amount sufficient to reduce bacterial count to an acceptable level for the particular liquid product and dried powder product 30 being made. Temperature values that provide sufficiently safe levels of bacteria for different liquid products and dried powder product(s) 30 may be predetermined and stored or entered into the control system 45. The particular amount of heating will be based on such acceptable level of bacteria and/or bacterial reduction and may also be based on other characteristics of the liquid product and/or dried powder product(s) 30, such as gelling, as well as browning or burning, foaming, unacceptably changing viscosity, or otherwise compromising its integrity. As one example, to produce a WPC 80 35% (whey protein concentration of 80% and protein at 35% of total solids) as the dried powder product 30 from a liquid whey product, the liquid whey product may be heated to a temperature that is sufficient to kill bacteria but not exceed 140° F. because this level of solids and protein can gel at temperatures above 140° F. Other liquid products without such gel setting can be heated to higher temperatures.

Many changes and modifications could be made to the invention without departing from the spirit thereof. The scope of these changes will become apparent from the appended claims.

What is claimed is:

1. A method of converting a liquid dairy product into a powdered dairy product in a multi-level spray drying facility, the method comprising:
   delivering a liquid dairy product to a pump in a first level that defines a lower level at a first height within the multi-level spray drying facility of the multi-level spray drying facility;
   pressurizing the liquid dairy product with a pump to provide a pressurized liquid dairy product;
   delivering the pressurized liquid dairy product to a second level that defines an upper level at a second height within the multi-level spray drying facility that is greater than the first height;
   heating the pressurized liquid dairy product to reduce bacteria immediately before a drying procedure, including:
      heating the pressurized liquid dairy product in the upper level of the multi-level spray drying facility to a temperature that is:
         great enough to kill bacteria in the pressurized liquid dairy product, and
         low enough to avoid at least one of gelling, browning, burning, and foaming the pressurized liquid dairy product; and
      immediately after heating, spraying the heated pressurized liquid dairy product as an atomized spray into an upper end of a drying chamber of a drying tower at the upper level of the multi-level spray drying facility.

* * * * *